United States Patent [19]
Ujiie

[11] Patent Number: 5,161,194
[45] Date of Patent: Nov. 3, 1992

[54] SATELLITE COMMUNICATIONS SYSTEM OPERATING IN ASYNCHRONOUS MODE FOR CENTRAL-TO-TERMINAL STATION TRANSMISSION

[75] Inventor: Mikio Ujiie, Tokyo

[73] Assignee: NEC Corporation, Japan

[21] Appl. No.: 559,257

[22] Filed: Jul. 30, 1990

[30] Foreign Application Priority Data

Jul. 31, 1989 [JP] Japan ................................ 1-198221

[51] Int. Cl.⁵ .............................................. H04L 9/02
[52] U.S. Cl. ......................................... 380/48; 380/49; 380/23; 455/12.1; 370/94.1
[58] Field of Search ....................... 380/21, 33, 42, 43, 380/48, 49; 455/8, 10, 12.1, 52.1; 370/94.1, 94.2, 94.3, 104.1, 105.4, 107

[56] References Cited

U.S. PATENT DOCUMENTS

| | | | |
|---|---|---|---|
| 3,778,715 | 11/1973 | Schmidt et al. | 455/8 X |
| 4,287,598 | 9/1981 | Langseth et al. | 455/12 X |
| 4,720,873 | 1/1988 | Goodman et al. | |
| 4,866,770 | 9/1989 | Seth-Smith et al. | 380/21 X |
| 4,947,451 | 8/1990 | Nawata | 455/8 |
| 4,953,210 | 8/1990 | McGlynn et al. | 380/48 |
| 5,048,087 | 9/1991 | Trbovich et al. | 380/43 X |

*Primary Examiner*—Tod Swann
*Attorney, Agent, or Firm*—Ostrolenk, Faber, Gerb & Soffen

[57] ABSTRACT

In a satellite communications system, a unique word is transmitted from a central station at frame intervals to the satellite and broadcast to terminal stations. Blocks of data from the central station are composed into packets which are exclusively encrypted, and asynchronously transmitted to the satellite by giving priority to the unique word by interrupting the transmission of packets. A copy of data signals from the central-station data terminals is stored and retransmitted to a terminal station in response to a repeat request signal received therefrom. In each terminal station, the unique word is detected to generate a timing signal in response to which the encrypted packet is deciphered. The deciphered packets are decomposed into blocks of data, and sent to a destination data terminal. If there is an error in the decomposed packets, a repeat request signal is transmitted from the terminal station through a terrestrial link to the central station to cause retransmission of a copy of the stored version of the disrupted packet.

9 Claims, 6 Drawing Sheets

SATELLITE COMMUNICATIONS SYSTEM OPERATING IN ASYNCHRONOUS MODE FOR CENTRAL-TO-TERMINAL STATION TRANSMISSION

BACKGROUND OF THE INVENTION

The present invention relates generally to a satellite communications system, and more specifically to very small aperture terminals (VSAT).

With conventional satellite communications systems having a central station and a plurality of terminal stations, data packets are organized into a framed sequence by the central station using a unique word as a start timing of the sequence and by containing in it a header for identifying the individual frame. However, this framing procedure requires complex circuitry for storing data and composing it into a frame. This is an unfavorable factor for small aperture satellite terminals where equipment cost and size are of primary concern. Furthermore, there is often a need to provide only a one-way communication path from the central station to the terminal stations,

SUMMARY OF THE INVENTION

It is therefore an object of the present invention to provide a satellite communications system in which the central and terminal station equipment is less bulky and more economical by allowing packets to be transmitted asynchronously without forming them into a framed sequence.

According to the present invention, there is provided a satellite communications system having a central station which establishes a one-way satellite channel through a satellite transponder to a plurality of terminal stations each serving terminal-station data terminals. In the central station, a unique word generator is provided for transmitting a unique word at periodic intervals to the satellite transponder. A packet assembler composed blocks of data from the central-station data terminals into packets each containing the address of a terminal-station data terminal, the packets following a unique word being encrypted in response to the timing of that unique word, and asynchronously transmitted to the satellite transponder by interrupting transmission of packets whenever a unique word is generated. A copy of data signals from the central-station data terminals is stored and is retransmitted to a terminal station in response to a repeat request signal which is received therefrom through a terrestrial link when an error is detected.

In each of the terminal stations, a unique word is detected from a signal received from the satellite transponder and a decryption timing signal is generated. A decrypting circuit utilizes this signal for decrypting the packets in the received signal. A packet deassembler is provided for decomposing the deciphered packets into blocks of data, applying the data blocks to the terminal-station data terminals according to the address contained in the decomposed packets, and detecting an error in the decomposed packets. In response to the detection of an error, a repeat request signal is transmitted from the terminal station to the central station to cause it to retransmit a copy of the stored version of the lost or disrupted packet.

BRIEF DESCRIPTION OF THE DRAWINGS

The present invention will be described in further detail with reference to the accompanying drawings, in which.

DETAILED DESCRITPTION

Figure 1:
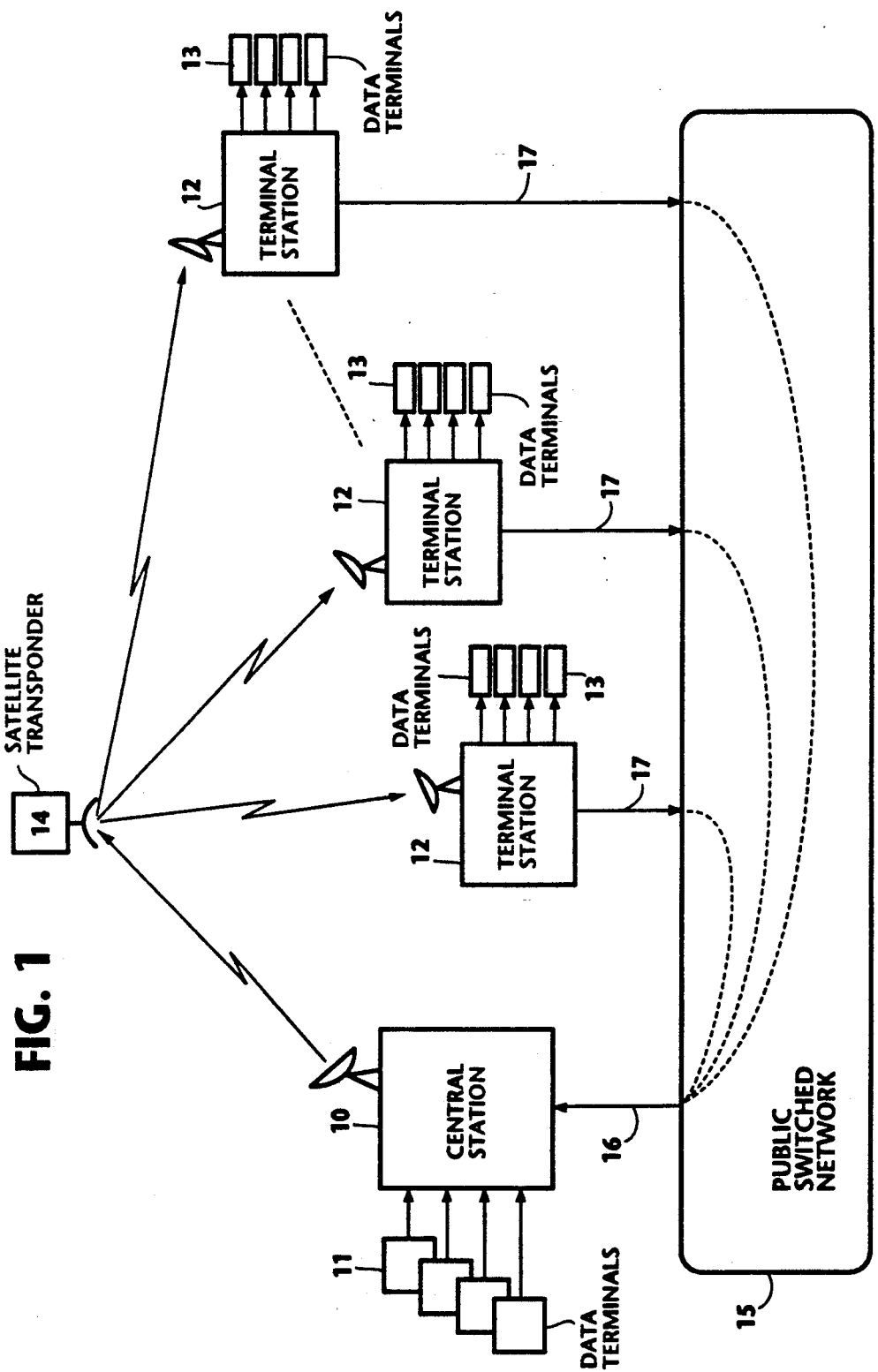
FIG. 1 is a block diagram of a satellite communications system of the present invention.

Referring now to FIG. 1, there is shown a satellite communications system according to the present invention. The system comprises a central earth station 10 which serves data terminals 11, and a plurality of terminal earth stations 12 serving data terminals 13. Central station 10 transmits asynchronous data packets to a satellite 14 which broadcasts the received packets to terminal stations 12. Each terminal station has an exchange line 17 to the public switched communications network 15 to transmit through it a repeat request signal to central station 10 whenever a loss of a packet or an error occurs in a received signal. Central station 10 has an exchange line 16 through which it receives the repeat request signal from each terminal station to retransmit a copy of the disrupted packet to the satellite 14. All communications of the system are made in a direction from data terminals 11 to data terminals 13 via satellite 14, and all data terminals 13 operate exclusively in a receive mode. In this way, the satellite circuit is used exclusively for one-way communication from central station 10 to terminal stations 12 for data transmission purposes and a terrestrial system is used exclusively for one-way communication from terminal stations 12 to central station 10 for repeat-request error correction purposes.

Figure 2:
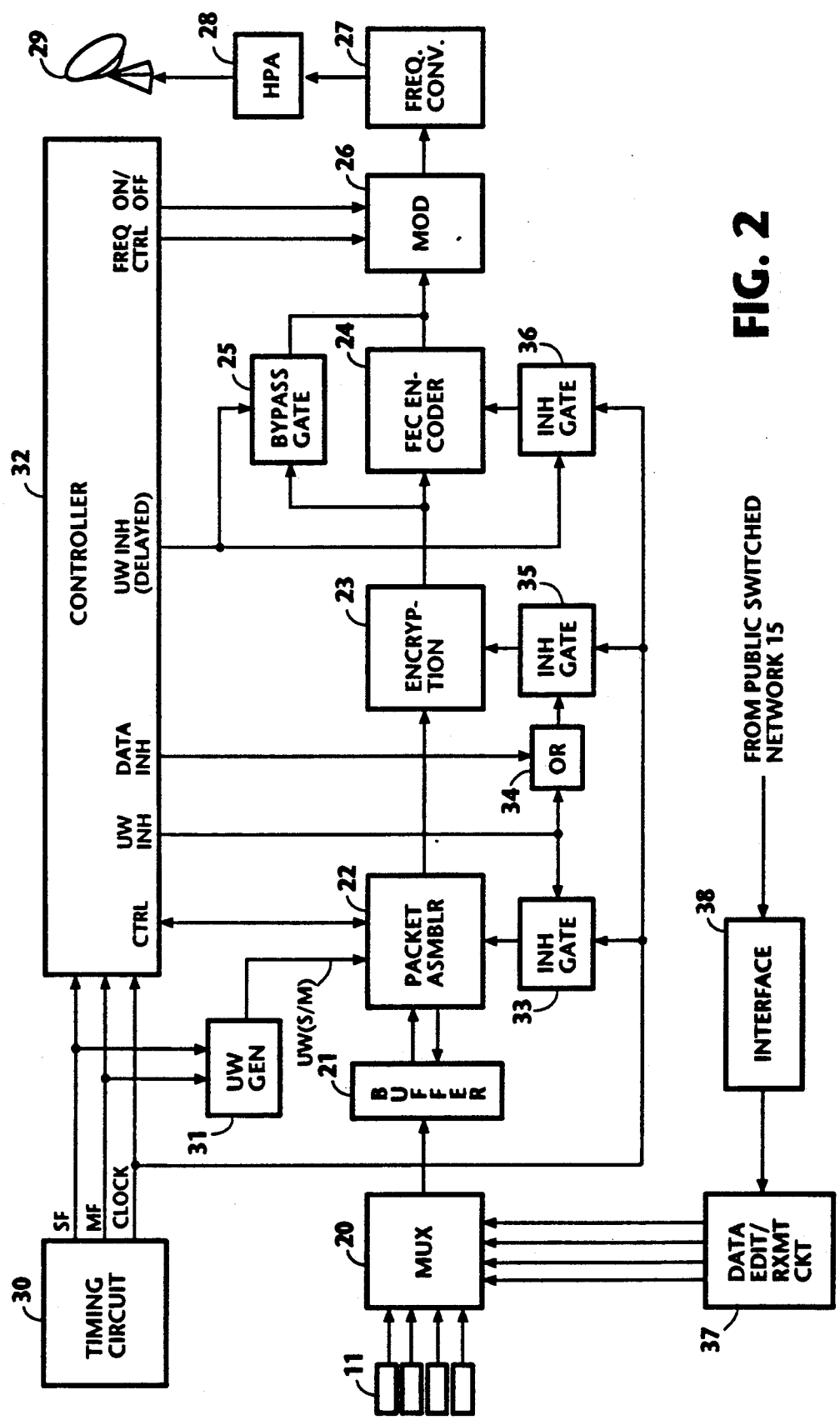
FIG. 2 shows in block form the central station of FIG. 1.

As shown in FIG. 2, central station 10 comprises a multiplexer 20 which provides multiplexing of blocks of data asynchronously supplied from data terminals 11 and data blocks from a date edit/retransmit circuit 37 and supplies a serial data stream to a first-in-first-out buffer 21 the output of which is coupled to a packet assembler 22. Buffer 21 accommodates the differences between the speed at which the output of multiplexer 20 is transferred to buffer 21 and the speed at which packet assembler 22 receives its input from buffer 21 by compressing the time scale of the signal from multiplexer 20.

Figure 3:
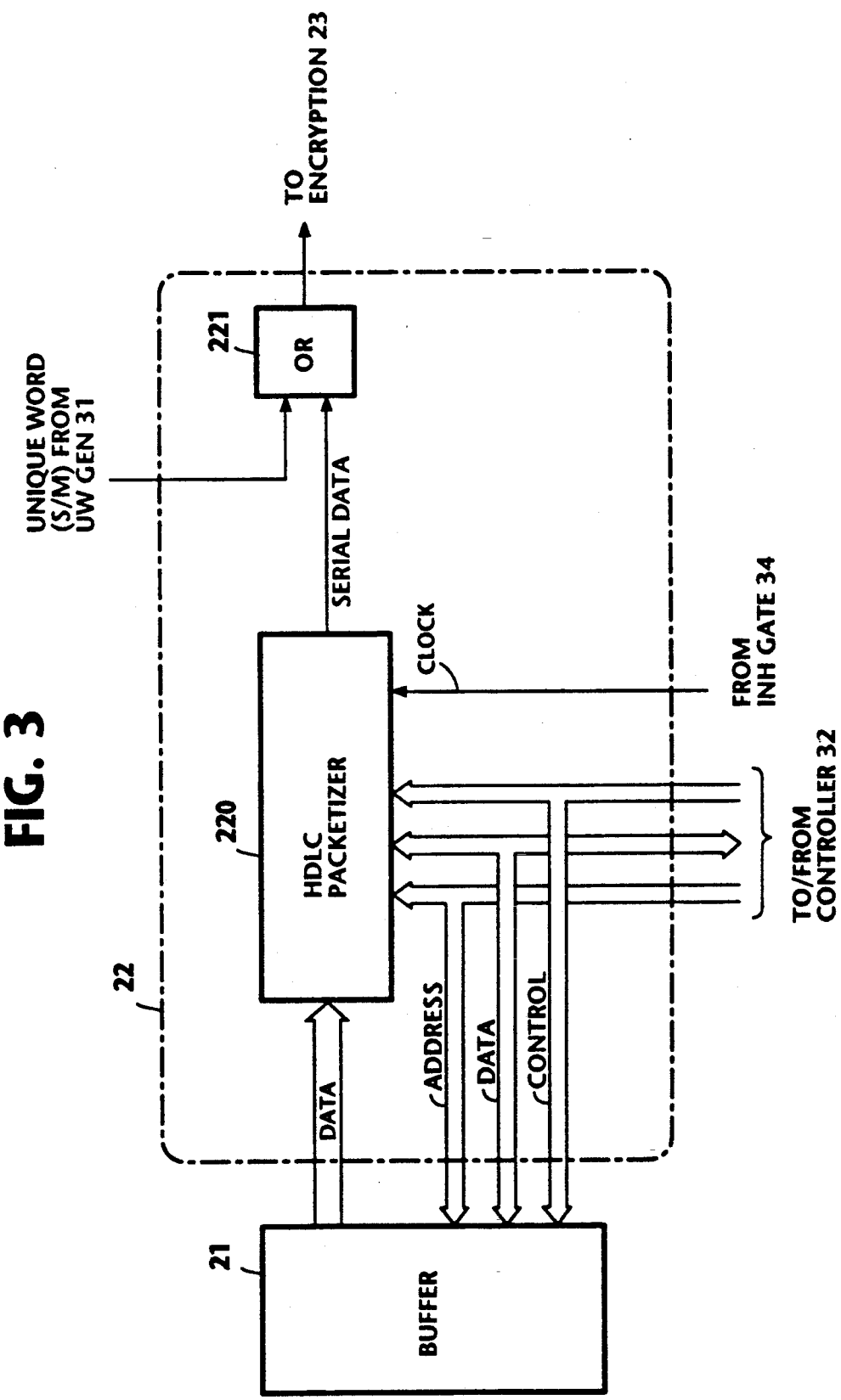
FIG. 3 shows details of the packet assembler of FIG. 2.

Packet assembler 22 provides packetization of the outpuf of buffer 21 according to the data format of the High Level Data Link Control (HDLC) protocol by combining protocol signals supplied from controller 32. As shown in FIG. 3, packet assembler 22 includes a HDLC packetizer 220 of known design and an OR gate 221. Packetizer 220 receives data blocks from buffer 21 in parallel form, and is connected by address bus, data bus and control bus to buffer 21 as well as to controller 32 to assemble the received parallel data blocks into an HDLC packet and asynchronously delivers it in serial form to one input of OR gate 221 in response to a clock pulse, which is received via an inhibit gate 33 from a timing circuit 30. To the other input of OR gate 221 is applied a unique word of any bit sequence (single frame format or multiframe format) from a unique word generator 31 to produce a combined packet sequence. This unique word generator 31 generates a multiframe unique work UW(M) at multiframe intervals as well as a single-frame unique work UW(S) at frame intervals using frame timing signal (SF) and multiframe timing signal (MF) supplied from timing circuit 30 (see also FIG. 4). The purpose of the multiframe unique word is to signify that data packets being transmitted are destined to a particular network to which all communications needs no encryption. These data packets are therefore not encrypted at the central station and hence, no decryption process should be performed on these packets at the destinations.

Controller 32 receives the clock and frame timing signals from timing circuit 30 and data signals from packet assembler 22 to generate a unique-word inhibit pulse at frame intervals and a data inhibit pulse at multiframe intervals. The unique-word inhibit pulse is applied to inhibit gate 33 to interrupt the application of clock pulses to packet assembler 22 to "freeze" its operation and allow unique words to be transmitted in precedence over packets.

Figure 4:
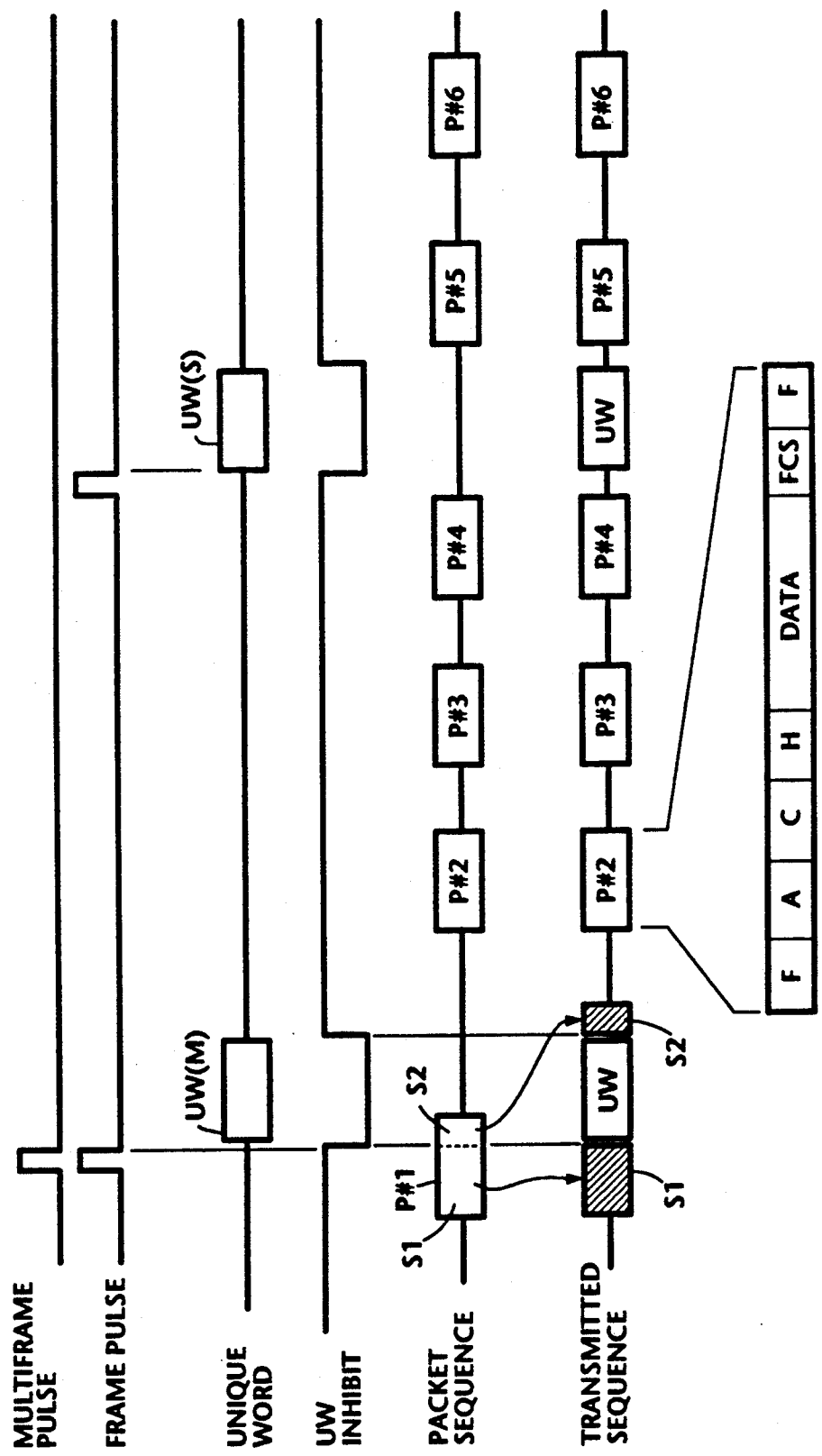
FIG. 4 is a timing diagram associated with FIG. 2.

Since HDLC packets are asynchronously generated by packetizer 220 and supplied to OR gate 221, there is a likelihood of a HDLC packet coinciding with a unique word. In FIG. 4, assume that a sequence of packets #1 to #6 is transmitted and a unique word UW(S) occurs in the interval between packets #4 and #5, and so this unique word is interposed therebetween on a transmitted sequence, while unique word UW(M) overlaps with a later segment S2 of packet #1 when the earlier segment S1 has just been transmitted through OR gate 221. This unique word UW(M) passes through OR gate 221 and is transmitted immediately following the earlier segment S1 of packet #1. The corresponding unique-word inhibit pulse disables the packetizer 220 so that the later portion S2 of packet #1 remains in the packetizer 220 for the period of this inhibit pulse and other data bits therein are "frozen". This fact is communicated through control bus to buffer 21 to interrupt its read operation on all subsequent data blocks. In response to the trailing edge of this inhibit pulse, packetizer 220 is supplied again with clock pulses to resume its operation, and so the later segment S2 of packet #1 is clocked out of the packetizer to OR gate 221 and transmitted consecutively with the unique word UW(M). Therefore, a packet is broken apart into two segments when it coincides with a unique word in order to allow the latter to be transmitted in precedence over its later part, and immediately following the transmission of the unique word, the later part of the packet is transmitted. In this way, the broken packet segments can be transmitted on successive frames and the need for framing all packets is eliminated. The packet generated by the packetizer 220 is in the format as shown in FIG. 4. THe HDLC packet is encapsulated between starting and ending flag sequences F, and an address field A follows the starting flag F. Address field is followed by a control field C containing data concerning the HDLC protocol. A header H is provided to contain the address of destination terminal station and the address of the destination data terminal, and attributes of data being transmitted. Following the header H is a data field D on which an asynchronous data block from a source data terminal 11 of central station 10 is carried. A frame check sequence FCS is provided to allow error detection and correction in a well known manner.

Although the terms "frame" and "multiframe" are used in this specification, all data packets are sent without being formed into a framed sequence. These terms are used to define periods between successive unique words which indicate the start timing for timing signals.

Encryption circuit 23 is connected to the output of OR gate 221 of packet assembler 22 to encrypt HDLC data packets by combining them with a keyword (psuedorandom number sequence) using an exclusive-OR gate, not shown. In a preferred embodiment, keywords of different bit pattern are generated so that they change periodically at multiframe intervals. This encryption circuit 23 is responsive to the clock pulse from timing circuit 30 to clock the pseudorandom number sequence into the exclusive-OR gate. However, no encryption is effected on unique words by inhibiting the clock which is supplied to encryption circuit 23 through an inhibit gate 35 in response to the unique-word inhibit pulse applied through an OR gate 34.

The data-inhibit pulse from controller 32 is applied to OR gate 34 to disable the clock supply to encryption circuit 23 when data packets to a network which needs no encryption are being transmitted.

The output of encryption circuit is applied to FEC encoder 24 as well as to a bypass gate 25. This encoder is typically a convolutional encoder with a ½ or ¾ code rate. The unique-word inhibit pulse applied to inhibit gates 33 and 35 is appropriately delayed and applied from controller 32 to an inhibit gate 36 through which the clock is supplied to FEC encoder 24 to disable its operation during the unique word period. Bypass gate 25 is activated in response to this delayed unique-word inhibit pulse to allow the nonencrypted unique word from encryption circuit 23 to be multiplexed with encrypted data packets at the output of encryption circuit 23 to form a sequence of nonencrypted unique words and encrypted data packets. This sequence is applied to a modulator 26 in which it is phase-modulated in a first stage upon a first carrier and then converted in a second stage to an intermediate frequency which can be varied in response to a frequency control signal supplied from controller 32. For saving the power of the satellite's transponder, the output of modulator 26 is turned off in response to a power ON/OFF signal from controller 32 when the central station has no packets to transmit for an extended period of time.

The output of modulator 26 is converted to an uplink frequency by a frequency converter 27 and amplified by a high-gain power amplifier 28 for transmission from central station antenna 29 to the satellite transponder.

Repeat request signals are transmitted from the terminal stations whenever an error occurs and are received through public switched network 15 by a data edit/retransmit circuit 37 by way of a line interface 38. Details of data edit/retransmit circuit 37 in connection with multiplexer 20 are shown in FIG. 5.

Figure 5:
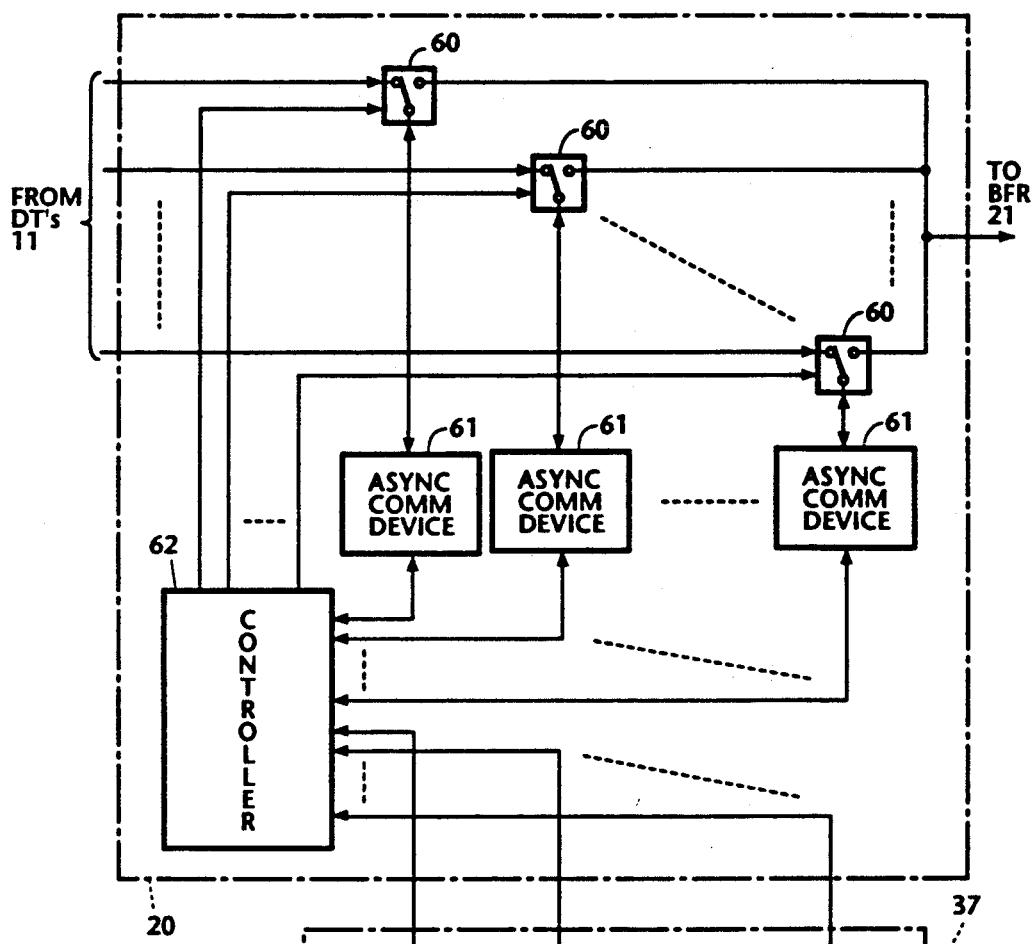
FIG. 5 shows details of the multiplexer and data edit/retransmit circuit of FIG. 2.
Figure 6:
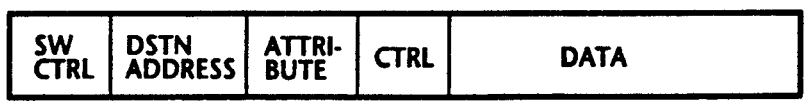
FIG. 6 is a data format of the signal generated by the data edit/retransmit circuit during retransmission of a packet.

In FIG. 5, multiplexer 20 includes switches 60 whose input terminals are respectively coupled to data terminals 11 to supply incoming data blocks to asynchronous communication devices 61. The ouput terminals of switches 60 are connected together to first-in-first-out buffer 21. The output terminals of asynchronous communication devices 61 are connected to a controller 62, which controls the exchanging of data between devices 61 and corresponding buffers 70 provided in the data edit/retransmit circuit 37 and it further controls the switches 60 to receive signals from data terminals 11 for storage into buffers 70 or transmit signals stored in buffer 70 to buffer 21. Data edit/retransmit circuit 37 further includes a controller 71 which monitors the storage level of each buffer 70 and reads the stored signals out of the buffers into communication devices 61. Controller 71 is connected to interface 38 to receive a repeat request signal that is transmitted from a terminal station. In response to the repeat request signal, data stored in a corresponding one of the buffers 70 is retrieved and a copy of the data is generated in a format as shown in FIG. 6, which contains a switch control field including an ON/OFF switching signal which controls one of the switches 60 to set up a path to buffer 21 or a path to a data terminal 11, an address field including the address of a destination terminal station and destination data terminal, and an attribute field containing the attributes of data to be retransmitted. Following the attribute field is a control field containing data indicating whether data being transmitted need decryption or not, and a data field in which a copy of the data to be transmitted is inserted.

Figure 7:
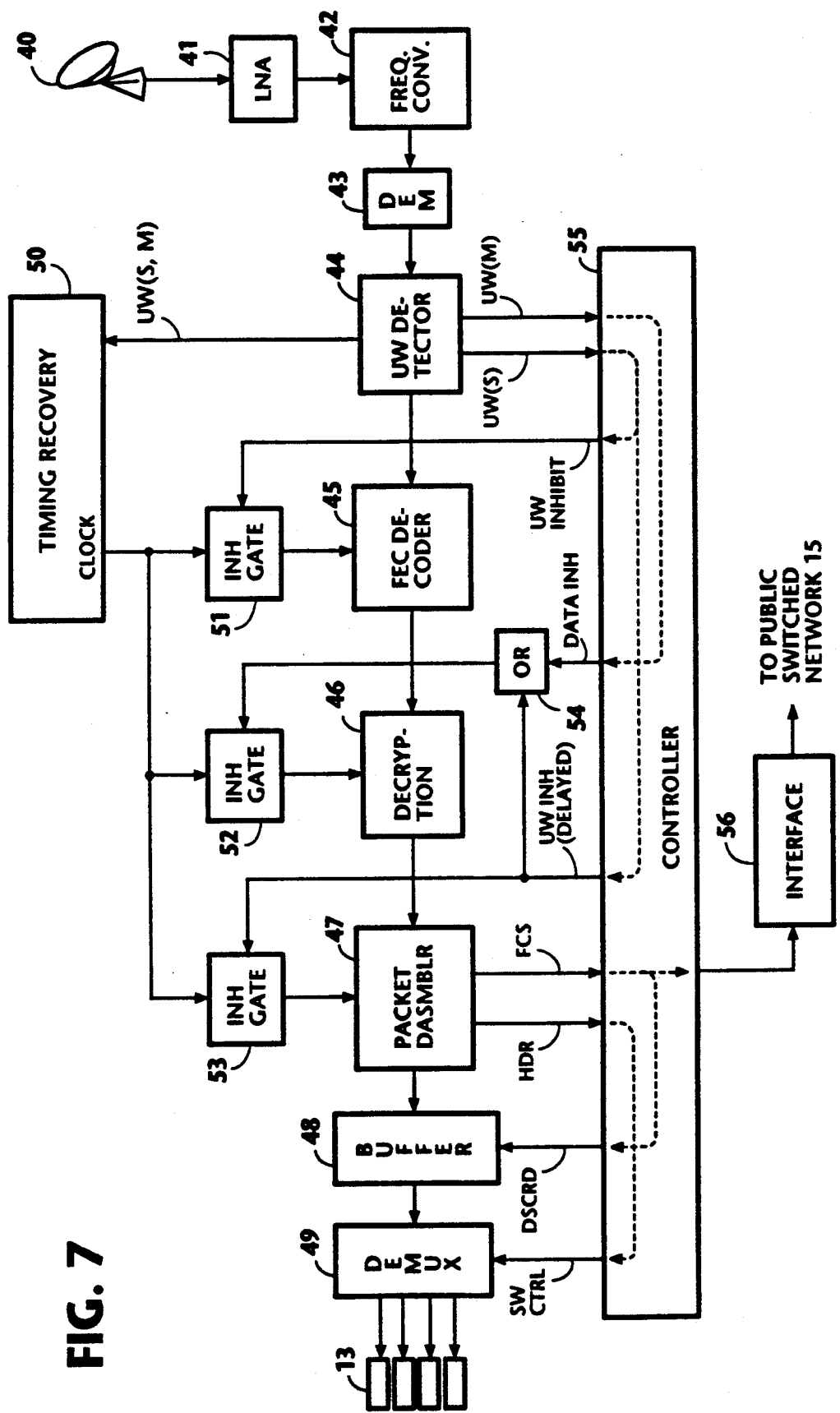
FIG. 7 is a block diagram of each terminal station of FIG. 1.

In FIG. 7, details of each terminal station are illustrated. Signals received by the satellite transponder are broadcast toward terminal stations 12 and received by each terminal station antenna 40 with a diameter of 0.5 to 1 meter, amplified by a low-noise amplifier 41, converted by frequency converter 42 to an intermediate frequency and fed to a demodulator 43. The output of demodulator 43 is applied to a unique word detector 44 which detects both single-frame unique words UW(S) and multiframe unique words UW(M) from the demodulated signal.

In response to the detection of each unique word, UW detector 44 applies a UW detect signal to a timing recovery circuit 50 to allow it to establish the start timing of a frame interval and applies unique-word detect signals UW(S) and UW(M) to a controller 55. In response to the detect signal UW(S), controller 55 applies a unique-word inhibit pulse to an inhibit gate 51 to interrupt the operation of a FEC decoder 45, or a Viterbi decoder to pass the received unique word therethrough to a decryption circuit 46. Controller also applies a delayed unique-word inhibit pulse to an inhibit 52 through an OR gate 54 to interrupt the operation of decryption circuit 46 and to an inhibit gate 53 to interrupt the operation of a packet deassembler 47.

In response to the detection of a multiframe unique word, UW(M) UW detector 44 communicates this fact to the controller 55 to cause it to inhibit the operation of a decryption circuit 46 when the data packets of the corresponding multiframe appear at the input of decryption circuit 46. In response to the detect signal UW(M), controller 55 applies a data inhibit pulse through OR gate 54 to inhibit gate 46 to interrupt the operation of decryption circuit 52 when nonencrypted packets are being received. By interrupting FEC decoder 45, decryption circuit 46 and packet deassembler 47 in this manner, segments of a packet broken apart by a unique word are reassembled in the data deassembler 47 to process its frame check sequence before it proceeds to deassemble it into data blocks.

Except for the unique words, all encrypted data packets are deciphered by decryption circuit 46 and supplied to packet deassembler 47. On the other hand, those data packets not encrypted by the central station are allowed to simply pass through decryption circuit 46 to packet deassembler 47. Packet deassembler 47 decomposes data packets of the HDLC format from the incoming signal by using the clock pulses supplied from timing recovery circuit 50 and applies the header of each HDLC data packet to controller 55 to allow it to determine whether each packet is destined to that terminal station, and if it is, it proceeds to identify which data terminal the packet is to be transmitted to. Controller 55 generates a switching control signal in accordance with the identified data terminal and supplies it to a demultiplexer 49. While packet deassembler 47 proceeds in this manner, it passes the data field of the decomposed packet as a block of data to a first-in-first-out buffer 48. Packet deassembler 47 processes the frame check sequence of each received packet. If an error is detected in a packet, packet deassembler 47 signals this fact to controller 55. In response to this error indicating signal, controller 55 directs the buffer 48 to discard a corresponding data block, and generates a repeat request signal and transmits it through interface 56 to the public switched network 15.

Buffer 48 operates in a process inverse to that of the buffer 21 of central station so as to accommodate the difference between the transfer speed of asynchronous data to be fed to demultiplexer 49 and the speed of the incoming blocks of data from packet deassembler 47 by expanding the time scale of each data block. Demultiplexer 49 asynchronously transmits blocks of data supplied from buffer 48 to one of the data terminals 13 which is determined by the switching control signal supplied from controller 55.

The repeat request signal from each terminal station contains a dialing signal to allow the switched network 15 to establish a connection from the terminal station to the central station, as well as address data identifying the destination terminal station and data terminal, and attributes of the data to be transmitted. The dialing signal may be generated by controller 55, or by interface 56. Alternatively, dedicated lines may be used instead of the public switched network 15 for transmitting the repeat signal from each terminal station to the central station. In such instances, no dialing signals need to be contained in the repeat request signal.

On receiving a repeat request signal, controller 71 of data edit/retransmit circuit 37 examines its contents and generates a signal as shown in FIG. 6 by reading the original version of the corrupted packet from the associated buffer 70 and applies it to the associated communication device 61 of multiplexer 20 through controller 62, which checks this signal and controls a corresponding switch 60 to allow passage of the retransmit packet to buffer 21. The switching control field of the packet is rewritten by the packet assembler 22 with information indicating that the packet is a retransmit packet.

Since all data packets can be transmitted in an asynchronous mode from central station 10 regardless of the presence of unique words, it is not necessary to store data bits sufficient to divide them into successive frames and organize them into a framed sequence each containing a header. This simplifies the circuitry of both the central station and the terminal stations.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A satellite communications system having a central station serving central-station data terminals for transmitting signals through a one-way satellite channel to a satellite transponder which broadcasts received signals to a plurality of terminal stations each serving terminal-station data terminals, said central station comprising:

unique word generator means for generating a unique word at periodic intervals;

packet assembler means including means for composing blocks of data from the central-station data terminals into packets, each of the packets further containing an address of a data terminal of said terminal stations and asynchronously supplying the packets to an output terminal of the packet assembler means, said packet assembler means further including means for stopping operation of said packet composing means at the beginning of said unique word to allow said unique word to be supplied to said output terminal and restarting operation of said packet composing means at the end of said unique word;

encrypting means connected to said output terminal of the packet assembler means for encrypting said packets while not encrypting said unique words, and generating a series of encrypted packets and nonencrypted unique words for transmission to said satellite transponder; and each of said terminal stations comprising:

unique word detector means for detecting a unique word from a signal received from said satellite transponder to generate a timing signal;

decrypting means for decrypting the encrypted packets in said received signal in response to said timing signal; and packet deassembler means for decomposing the deciphered packets into blocks of data, and applying the data blocks to the terminal-station data terminals according to the address contained in the decomposed packets.

2. A satellite communications system as claimed in claim 1, wherein said central station further comprises retransmit means for storing a copy of data blocks from said central-station data terminals and supplying the stored copy to said packet assembler means in response to a repeat request signal, and wherein the packet deassembler means further comprises means for detecting an error in a received packet, each of said terminal stations further including repeat request transmit means for transmitting a repeat request signal to said central station in response to the detection of an error by said packet deassembler means, wherein said repeat request signal contains a dialing signal and is transmitted via a terrestrial switched communications network to said central station.

3. A satellite communications system as claimed in claim 1, wherein the unique word generator means further generates a second unique word at periodic intervals for disabling said encrypting means during a period of time in which packets not requiring encryption are transmitted to said transponder, and wherein said unique word detector means further detects said second unique word for disabling said decrypting means during a period of time in which said packets not requiring encryption are received from said transponder.

4. A satellite communications system as claimed in claim 1, wherein said central station further comprises a forward error correction encoder for exclusively encoding said packets, and wherein each of said terminal stations includes a forward error correction decoder for exclusively decoding said packets.

5. A communication method for a satellite communications system having a central station serving central-station data terminals for transmitting signals through a one-way satellite channel to a satellite transponder which broadcasts received signals to a plurality of terminal stations each serving terminal-station data terminals, comprising:

a) transmitting a unique word at periodic intervals to said satellite transponder, composing blocks of data from the central-station data terminals into packets, each of the packets further containing an address of a data terminal of said terminal stations, asynchronously transmitting each of the packets to said satellite transponder, stopping the asynchronous transmission of a packet at the beginning of said unique word to allow transmission of the unique word, and starting the asynchronous transmission of the remainder of the packet at the end of said unique word;

b) exclusively encrypting said packets and transmitting the encrypted packets to said satellite transponder;

c) receiving a signal from said satellite transponder by each of said terminal stations and detecting said unique word from the received signal to generate a timing signal;

d) decrypting the packets in said received signal in response to said timing signal; and e) decomposing the deciphered packets into blocks of data, and transmitting the data blocks to the terminal-station data terminals according to the address contained in the decomposed packets.

6. A method as claimed in claim 5, further comprising the steps of:

storing a copy of data blocks from said central-station data terminals and transmitting the stored copy to said satellite transponder in response to a repeat request signal from said terminal stations;

detecting an error in said decomposed packets;

generating a dialing signal in response to the detection of said error; and transmitting a repeat request signal containing said dialing signal to said central station from a terminal station via a switched communications network.

7. A method as claimed in claim 5, further comprising:

transmitting a second unique word at periodic intervals to said satellite transponder from said central station, and disabling the step (b) for a period of time in which packets not requiring encryption are transmitted to said transponder, detecting said second unique word at each of said terminal stations, and disabling the step (d) in response to the detection of said second unique word for a period of time in which said packets not requiring encryption are received from said transponder.

8. A satellite communications system having a central station serving central-station data terminals for transmitting signals to a satellite transponder which broadcasts received signals to a plurality of terminal stations each serving terminal-station data terminals, said central station comprising:

unique word generator means for generating a unique word at periodic intervals; and packet assembler means including means for composing blocks of data from the central-station data terminals into packets, each of the packets further containing an address of a data terminal of the terminal stations and asynchronously supplying the packets to an output terminal of the packet assembler means, said packet assembler means further including means for stopping operation of said packet composing means at the beginning of said unique word to allow said unique word to be supplied to said output terminal and restarting operation of said packet composing means at the end of said unique word, and each of said terminal stations comprising:

unique word detector means for detecting a unique word from a signal received from said satellite transponder to generate a timing signal; and packet deassembler means for decomposing packets contained in the received signal into blocks of data in response to said timing signal, and applying the data blocks to the terminal-station data terminals according to the address contained in the decomposed packets.

9. A satellite communications system having a central station serving central-station data terminals for transmitting signals via a one-way satellite channel to a satellite transponder which broadcasts received signals to a plurality of terminal stations each serving terminal-station data terminals, said central station comprising:

unique word generator means for generating a unique word at periodic intervals;

packet assembler means including means for composing blocks of data from the central-station data terminals into packets, each of the packets further containing an address of a data terminal of the terminal stations and asynchronously supplying the packets to an output terminal, said packet assembler means further including means for stopping operation of said packet composing means to allow said unique word to be supplied to said output terminal, and restarting operation of said packet composing means at the end of said unique word; and retransmit means for storing a copy of said data blocks from the central-station data terminals and supplying the copy to said packet assembler means in response to a repeat request signal, and each of said terminal stations comprising:

unique word detector means for detecting a unique word from a signal received from said satellite transponder to generate a timing signal;

packet deassembler means for decomposing packets contained in the received signal into blocks of data in response to said timing signal, and applying the data blocks to the terminal-station data terminals according to the address contained in the decomposed packets, said packet deassembler means further having means for detecting an error in said blocks of data; and repeat request transmit means for transmitting said repeat request signal via a terrestrial switched communications network to said central station in response to the detection of an error by said packet deassembler means.

* * * * *